(12) United States Patent
Harris

(10) Patent No.: US 7,117,502 B1
(45) Date of Patent: Oct. 3, 2006

(54) LINKED-LIST IMPLEMENTATION OF A DATA STRUCTURE WITH CONCURRENT NON-BLOCKING INSERT AND REMOVE OPERATIONS

(75) Inventor: Timothy L. Harris, Cambridge (GB)

(73) Assignee: Sun Microsystems, Inc., Santa Clara, CA (US)

( * ) Notice: Subject to any disclaimer, the term of this patent is extended or adjusted under 35 U.S.C. 154(b) by 980 days.

(21) Appl. No.: 09/710,218

(22) Filed: Nov. 10, 2000

(51) Int. Cl.
*G06F 9/54* (2006.01)

(52) U.S. Cl. .................. 719/315; 710/200; 707/103 R

(58) Field of Classification Search .................. 707/8, 707/100, 103 R; 719/313–315; 710/200
See application file for complete search history.

(56) References Cited

U.S. PATENT DOCUMENTS

| | | | | |
|---|---|---|---|---|
| 4,584,640 | A * | 4/1986 | MacGregor et al. | 707/200 |
| 5,081,572 | A * | 1/1992 | Arnold | 711/163 |
| 5,765,175 | A * | 6/1998 | Needham et al. | 707/206 |
| 5,924,098 | A * | 7/1999 | Kluge | 707/100 |
| 6,360,220 | B1* | 3/2002 | Forin | 707/8 |
| 6,581,063 | B1* | 6/2003 | Kirkman | 707/100 |
| 6,651,146 | B1* | 11/2003 | Srinivas et al. | 711/150 |

FOREIGN PATENT DOCUMENTS

| | | |
|---|---|---|
| EP | 0 366 585 A | 5/1990 |
| EP | 0 466 339 A2 | 1/1992 |
| WO | WO 86 00434 A | 1/1986 |

OTHER PUBLICATIONS

Valois, "Lock-Free Linked Using Compare-and-Swap," in Proceedings of the Fourteenth ACM Symposium on Principles o Distributed Computing, Aug. 1995, pp. 214-222.*

Ole Agesen et. al, "DCAS-Based Concurrent Deques," Jul. 2000, p. 137-146.*

Henery Massalin et. al, "A Lock-Free Multiprocessor OS Kernel," Jun. 1991, Department of Computer Science Columbia University, Technical Report No. 10027.*

Prasad Jayanti and Srdjan Petrovic, "Efficient and Practical Constructions of LL/SC Variables," ACM, Jul. 13-16, 2003, p. 285-294.*

Arora, Blumofe and Plaxton, *Thread Scheduling for Multiprogrammed Multiprocessors*, in *Proceedings of the 10th Annual ACM Symposium on Parallel Algorithms and Architectures* (1998) pp. 119-129.

Greenwald and Cheriton, *The Synergy Between Non-Blocking Synchronizatio and Operating System Structure*, Dept. of Computer Science, Univ. of Rochester, NY (1998), 14 pp.

Greenwald, *Non-Blocking Synchronization and System Design*, PhD thesis, Stanford University Technical Report STAN-CS-TR-99-1624, Palo Alto, CA, (1999) pp. 1-24.

LaMarca, *A Performance Evaluation of Lock-Free Synchronization Protocols* in *Proceedings of the 13th Annual ACM Symposium on Principles of Distributed Computing* Los Angeles, CA, (Aug. 14-17, 1994), pp. 130-140.

(Continued)

*Primary Examiner*—William Thomson
*Assistant Examiner*—Li Zhen
(74) *Attorney, Agent, or Firm*—Zagorin O'Brien Graham LLP

(57) ABSTRACT

A simple and therefore highly usable non-blocking implementations of linked-lists can be provided using read, write, and CAS operations. Several realizations of linked-list based data-structures are described, which are non-blocking, linearizable, and exhibit disjoint-access for most operations. In other words, the realizations are non-blocking and linearizable while maintaining the property that operations on disjoint parts of the list do not interact, effectively lowering contention and increasing concurrency. We implement three exemplary data structures: sets, multi-sets, and ordered-sets. The exemplary implementations support insert, remove, and find operations, with natural semantics. An ordered-set implementation supports an additional removeGE operation.

30 Claims, 9 Drawing Sheets

OTHER PUBLICATIONS

Massalin and Pu, *A Lock-free Multiprocessor OS Kernel*, Tech. Rep. TRCUCS-005-9, Columbia University, New York, NY, (1991) 21 pp.

Michael and Scott, *Correction of a Memory Management Method for Lock-Free Data Structures*, TR599, Dept. of Computer Science, Univ. of Rochester, NY (Dec. 1995) pp. 1-7.

Michael and Scott, *Non-Blocking Algorithms and Preemption-Safe Locking on Multiprogrammed Shared Memory Multiprocessors*, Dept. of Computer Science, Univ. of Rochester, NY (1998) pp. 1-24.

Michael and Scott, *Simple, Fast, and Practical Non-Blocking and Blocking Concurrent Queue Algorithms* in *15th ACM Symposium on Principles of Distributed Computing* (May 1996) 9 pp.

Valois, *Lock-Free Linked Lists Using Compare-and-Swap*, in *Proceedings of the Fourteenth ACM Symposium on Principles of Distributed Computing*, Ottawa, Canada (Aug. 1995) pp. 214-222.

Ole Agesen et al., "DCAS-Based Concurrent Deques," Proceedings of the Twelfth Annual ACM Symposium on Parallel Algorithms and Architectures (SPAA2000), Bar Arbor, Maine, online, Jul. 9-12, 2000, pp. 137-146 XP002172095, Association for Computing Machinery, ACM, New York, NY, [retrieved from the Internet on Jul. 13, 2001: URL:http://research.sun.com/jtech/subs/00-dequel.ps>].

Henry Massalin, "Synthesis: An Efficient Implementation of Fundamental Operating System Services," Dissertation submitted in partial fulfillment of the requirements for the Degree of Doctor of Philosophy in the Graduate School of Arts and Sciences, Columbia University, New York, NY, online, 1992; pp. 1-149 XP002172093 [retrieved from the Internet on Jul. 13, 2001: URL:ftp://ftp.cs.columbia.edu/reports/reports-1992/cucs-039-92.ps.gz].

David L. Detlefs et al., "Even Better DCAS-Based Concurrent Deques," Distributed Computing, 14th International Conference, Oct. 4, 2000, pp. 59-73, XP002172096.

Afek, Yehuda, et al., "Atomic snapshots of shared memory." In *Journal of ACM*, vol. 40, No. 4, pp. 873-890 Sep. 1993.

Afek, Yehuda, et al., "Wait-free made fast." In *Proceedings of the Twenty-Seventh Annual ACM Symposium on Theory of Computing*, Las Vegas, Nevada, United States, May 29-Jun. 1, 1995, pp. 538-547, ACM Press, New York, NY.

Afek, Yehuda, et al., "Disentangling multi-object operations." In *Proceedings of the Sixteenth Annual ACM Symposium on Principles of Distributed Computing*, Santa Barbara, California, United States, Aug. 21-24, 1997, pp. 111-120, ACM Press, New York, NY.

Agesen, Ole, et al., "An efficient meta-lock for implementing ubiquitous synchronization." In *Proceedings of the 14th ACM SIGPLAN Conference on Object-Oriented Programming, Systems, Languages, and Applications*, Denver, Colorado, United States, Nov. 1-5, 1999, pp. 207-222, ACM Press, New York, NY.

Attiya, Hagit and Dagan, Eyal, "Universal operations: unary versus binary." In *Proceedings of the Fifteenth Annual ACM Symposium on Principles of Distributed Computing*, Philadelphia, Pennsylvania, United States, May 23-26, 1996, pp. 223-232, ACM Press, New York, NY.

Attiya, Hafit and Rachman, Ophir, "Atomic snapshots in O(n log n) operations." In *Proceedings of the Twelfth Annual ACM Symposium on Principles of Distributed Computing*, Ithaca, New York, United States, Aug. 15-18, 1993, pp. 29-40, ACM Press, New York, NY.

Bacon, David F., et al., "Thin locks: featherweight synchronization for Java." In *Proceedings of the ACM SIGPLAN 1998 Conference on Programming Language Design and Implementation*, Montreal, Quebec, Canada, Jun. 17-19, 1998, pp. 258-268, ACM Press, New York, NY.

Barnes, Greg, "A method for implementing lock-free shared-data structures." In *Proceedings of the Fifth Annual ACM Symposium on Parallel Algorithms and Architectures*, Velen, Germany, Jun. 30-Jul. 2, 1993, pp. 261-270, ACM Press, New York, NY.

Detlefs, David, "Garbage Collection and Run-time Typing as a C++ Library." In *Proceedings of the 1992 USENIX C++ Conference*, pp. 37-56, Portland, Oregon, Aug. 1992.

Ben-Ari, Mordechai, "On-the-Fly Garbage Collection: New Algorithms Inspired by Program Proofs," *Lectures Notes in Computer Science*, vol. 140, pp. 14-22, Springer-Verlag, Berlin, Heidelberg, Germany, 1982.

Ben-Ari, Mordechai, "Algorithms for On-the-Fly Garbage Collection," *ACM Transactions on Programming Languages and Systems*, vol. 6, No. 3, pp. 333-344, Jul. 1984.

Bershad, B. N., "Practical Considerations for Non-Blocking Concurrent Objects," In *Proceedings of the 13th IEEE International Conference on Distributed Computing Systems*, Los Alamitos, California, United States, May 25-28, 1993, pp. 264-273, IEEE Computer Society Press.

Blumofe, Robert D. et al., "Verification of a Concurrent Deque Implementation," Technical Report TR99-11, University of Texas at Austin, Department of Computer Sciences, pp. 1-20, Jun. 1999.

Brown, Jeremy Hanford, "Memory Management on a Massively Parallel Capability Architecture," Thesis Proposal, MIT Artificial Intelligence Laboratory, pp. 1-68, Dec. 3, 1999, retrieved from URL: ai.mit.edu/projects/aries/Documents/jhbrown_thesis_proposal.pdf>.

Chuang, Tyng-Ruey et al., "Real-Time Deques, Multihead Turing Machines, and Purely Functional Programming," In *Proceedings of the Conference on Functional Programming Languages and Computer Architecture*, Copenhagen, Denmark, Jun. 9-11, 1993, pp. 289-298, ACM Press, New York, NY.

Detlefs, David, "Garbage Collection and Run-time Typing as a C++ Library," In *Proceedings of the 1992 Usenix C++ Conference*, Digital Equipment Corporation Systems Research Center, 20 pages, Jun. 18, 1992 retrieved from URL: citeseer.ist.psu.edu/detlefs92garbage.html>.

Detreville, John, "Experience with Concurrent Garbage Collectors for Modula-2+," Digital Equipment Corporation Systems Research Center Tech Report, No. 64, 68 pages, Nov. 22, 1990 (online), retrieved Apr. 1, 2002 from URL: gatekeeper:research.compaq.com/pub/DEC/SRC/research-reports/SRC-064.pdf>.

Dijkstra, E., "Solution to a Problem in Concurrent Programming Control," Communications of the ACM, vol. 8, No. 9, p. 569, 1965.

Goetz, Brian, "A First Look at JSR 166: Concurrency Utilities," 3 pages, Mar. 1, 2004. retrieved from URL: today.java.net/lpt/a/76>.

Goodman, James R., et al., "Efficient Synchronization Primitives for Large-Scale Cache-Coherent Multiprocessors," In *Proceedings of the Third International Conference on Architectural Support for Programming Languages and Operating Systems*, New York, NY, Boston, MA, United States, Apr. 3-6, 1989, pp. 64-75, ACM Press.

Gottleib, Allan, et al., "Basic Techniques for the Efficient Coordination Of Very Large Numbers Of Cooperating Sequential Processors," *ACM Trans. Program. Language Systems*, vol. 5, No. 2, pp. 164-189, Apr. 1983.

Herlihy, Maurice P., et al., "Linearizability: A Correctness Condition for Concurrent Objects," *ACM Transactions On Programming Languages and Systems*, vol. 12, No. 3, pp. 463-492, Jul. 1990.

Herlihy, Maurice P., "Wait-Free Synchronization," *ACM Transactions On Programming Languages and Systems*, vol. 11, No. 1, pp. 124-149, Jan. 1991.

Herlihy, Maurice, et al., "Transactional Memory: Architectural Support for Lock-Free Data Structures," Technical Report CRL 92/07, Digital Equipment Corporation, 12 pages, Cambridge Research Lab, 1992.

Herlihy, Maurice P., et al., "Lock-Free Garbage Collection for Multiprocessors," *IEEE Transactions on Parallel and Distributed Systems*, vol. 3, No. 3, pp. 229-236, May 1992.

Herlihy, Maurice, "A Methodology for Implementing Highly Concurrent Data Objects," *ACM Transactions on Programming Languages and Systems*, vol. 15, No. 5, pp. 745-770, Nov. 1993.

Hesselink, W. H. et al., "Waitfree distributed memory management by Create, and Read Until Deletion ({CRUD})," Technical Report: SEN-R9811, Dept. of Math. and Computing Science, University of Groningen, The citeseer.ist.psu.edu/hesselink98waitfree.html>.

Israeli, Amos et al., "Disjoint-Access-Parallel Implementations of Strong Shared Memory Primitives," In *Proceedings of the 13th Annual ACM Symposium on Principles of Distributed Computing*, Los Angeles, CA, United States, Aug. 14-17, 1994, pp. 151-160, ACM Press, New York, NY.

Lamport, Leslie, "How to Make a Multiprocessor Computer that Correctly Executes Multiprocess Programs," *IEEE Transactions on Computers*, vol. c-28, No. 9, pp. 690-691, Sep. 1979.

Lamport, Leslie, "A Fast Mutual Exclusion Algorithm," ACM *Transactions on Computer Systems*, vol. 5, No. 1, pp. 1-11, 1987.

Lotan, Itay et al., "Skiplist-Based Concurrent Priority Queues," In *Proceedings of the 14th International Parallel and Distributed Processing Symposium*, pp. 263-268, IEEE Computer Society, Washington, D.C., 2000.

Motorola. "M68040 User's Manual," 22 pages1993.

Mellor-Crummey, John, et al., "Algorithms for Scalable Synchronization on Shared-Memory Multiprocessors," In *ACM Transactions on Computer Systems*, vol. 9, No. 1, pp. 21-65, Feb. 1991.

Moir, Mark et al., "Wait-Free Algorithms for Fast, Long-Lived Renaming," *Science of Computer Programming*, vol. 25, No. 1, pp. 1-39, Aug. 1995.

Moir, Mark, "Practical implementation of non-blocking synchronization primitives," In *Proceedings of the Sixteenth Annual ACM Symposium on Principles of Distributed Computing*, Santa Barbara, CA, United States, Aug. 21-24, 1997, pp. 219-228, ACM Press, New York, NY.

Moir, Mark, "Transparent Support for Wait-Free Transactions," In *Proceedings of the 11th International Workshop on Distributed Algorithms*, pp. 305-319, Springer-Verlag, London, United Kingdom, 1997.

Pugh, William, "Concurrent Maintenance of Skip Lists," CS-TR-2222.1, Institute for Advanced Computer Studies, Dept. of Computer Science, University of Maryland, pp. 1-13, College Park, Maryland, United States, Jun. 1990.

Pugh, William, "Skip Lists: A Probablistic Alternative to Balanced Trees," *Communications of the ACM*, vol. 33, No. 6, pp. 668-676, Jun. 1990.

Rinard, Martin C., "Effective Fine-Grain Synchronization for Automatically Parallelized Programs Using Optimistic Synchronization Primitives," *ACM Trans. Computer Systems*, vol. 17, No. 4, pp. 337-371, Nov. 1999.

Saks, Michael et al., "Optimal Time Randomized Consensus—Making Resilient Algorithms Fast in Practice," In *Proceedings of the 2nd ACM SIAM Symposium on Discrete Algorithms*, pp. 351-362, Philadelphia, Pennsylvania, United States, Jan. 1991.

Shann, Chien-Hua et al., "A Practical Nonblocking Queue Algorithm Using Compare-and Swap," In *Proceedings of the Seventh International Conference on Parallel and Distributed Systems*, pp. 470-475, IEEE Computer Society, Washington, D.C., 2000.

Shavit, N., et al., "Software Transactional Memory," *Distributed Computing*, vol. 10, No. 2, pp. 99-116, Feb. 1997.

Turek, John et al., "Locking Without Blocking: Making Lock Based Concurrent Data Structure Algorithms Nonblocking," In *Proceedings of the Eleventh ACM SIGACT-SIGMOD-SIGART Symposium on Principles of Database Systems*, San Diego, California, United States, Jun. 2-5, 1992, pp. 212-222,ACM Press, New York, NY.

Jayanti, Prasad, "A Complete and Constant Time Wait-Free Implementation of CAS from LL/SC and Vice Versa," Distributed Computing: Proceedings of the 12th International Symposium, DISC'98, Andros, Greece, Lecture Notes in Computer Science, Sep. 1998, pp. 216-230, vol. 1499/1998, Springer Berlin / Heidelberg.

* cited by examiner

```
bool List::insert(KeyType key) {
  Node *new_node, *right_node, *left_node;

new_node = NULL;
  do {
    right_node = search (key, &left_node);

if ((right_node != tail) && (right_node->key == key)) {
      return false;
    } else {
      if (new_node == NULL) new_node = new Node(key);
      new_node->next = right_node;
      if (CAS (&(left_node->next), right_node, new_node)) /*C2*/
        return true;
    }
  } while (true); /*B3*/
}
```

FIG. 4

```
bool List::remove(KeyType search_key)

Node *right_node, *right_node_next, *left_node;

do {
    right_node = search (search_key, &left_node);

if ((right_node == tail) ||
        (right_node->key != search_key)) return false;
    right_node_next = right_node->next;
    if (!is_marked_reference(right_node_next))
      if (CAS(&right_node->next),      /* C3 */
             right_node_next,
             get_marked_reference(right_node_next)) {
        if (!CAS(&(left_node->next), right_node, right_node_next))  /* C4 */
          search(right_node->key,&left_node);
        return true;
      }
  } while (true); /*B4*/
}
```

501 — (covers the `if ((right_node == tail)` ... `get_marked_reference(right_node_next)) {` block)
502 — (covers the `if (!CAS(&(left_node->next)...` ... `return true;` block)
C3
C4
503
B4

FIG. 5

```
bool List::find (KeyType search_key)

Node *right_node;
  Node *left_node;

right_node = search (search_key, &left_node);
  return ((right_node != tail) && (right_node->key == search_key)) ;
}
```

FIG. 6

```
Node* List::search (KeyType search_key, Node **left_node) {
  Node *left_node_next;
  Node *right_node;

search_again:
  do {
    Node* t = head;
    Node* t_next = head->next;

/* 1: Find left_node and right_node */ do {
      if (!is_marked_reference(t_next)) {
        (*left_node) = t;
        left_node_next = t_next;
      }
      t = t_next;
      if (t == tail) break;
      t_next = t_next->next;
    } while (is_marked_reference(t_next) || (t->key < search_key)); /*B1*/
    right_node = t;

/* 2: Check if right_node is the immediate successor of left_node */ if (left_node_next == right_node)
      if ((right_node != tail) && is_marked_reference(right_node->next))
        goto search_again; /*G1*/
      else
        return right_node; /*R1*/

/* 3: Remove one or more marked nodes between left_node and right_node */ if (CAS (&((*left_node)->next), left_node_next, right_node)) /*C1*/
      if ((right_node != tail) && is_marked_reference(right_node->next))
        goto search_again; /*G2*/
      else
        return right_node; /*R2*/

} while (true); /*B2*/
}
```

FIG. 7

```
Node* List::deleteGE (KeyType search_key)

Node *right_node, *right_node_next, *left_node;

do {
  right_node = search (search_key, &left_node);

if (right_node == tail) return false; /*T1*/                          /*T1*/ right_node_next = right_node->next;
  if (!is_marked_reference (right_node_next)) {
   if (CAS (&(right_node->next),
        right_node_next,
        get_marked_reference (right_node_next))) { /*C5*/           /*C5*/
      if (!CAS (&(left_node->next), right_node, right_node_next)) /*C6*/
        search (right_node->key, &left_node);                       /*C6*/ return right_node;
   }
  }
 } while (true); /*B4*/
}                                                                   /*B4*/
```

FIG. 8

```
bool List::insert2 (KeyType key) {
  Node new_node*, *dup_right_node, *right_node, *left_node;

newNode = NULL;
  do {
    right_node = search (key, &left_node);

if ((right_node != tail) && (right_node->key == key))
      return false;
    else {
      if (new_node == NULL) new_node = new Node(key);
      if (right_node == tail) {
        new_node->next = tail;
        if (CAS (&(left_node->next), tail, new_node)) /*C7*/
          return true;
      } else {
        Node *right_node_next;
        dup_right_node = new Node (right_node->key);
        new_node->next = dup_right_node;
        right_node_next = right_node->next;
        if (!is_marked_reference (right_node_next)) {
          dup_right_node->next = right_node_next;
          if (CAS (&(right_node->next),
                   right_node_next,
                   get_marked_reference (dup_right_node))) { /*C8*/
            if (!CAS (&(left_node->next),
                   right_node,
                   new_node)) /*C9*/
              search (key, &left_node);
            return true;
          }
        }
      }
    }
  } while (true); /*B5*/
}
```

FIG. 10

LINKED-LIST IMPLEMENTATION OF A DATA STRUCTURE WITH CONCURRENT NON-BLOCKING INSERT AND REMOVE OPERATIONS

BACKGROUND OF THE INVENTION

1. Field of the Invention

The present invention relates to coordination amongst processors or execution threads in a multiprocessor computer, and more particularly, to structures and techniques for facilitating non-blocking access to concurrent shared objects.

2. Description of the Related Art

It is becoming evident that non-blocking algorithms can deliver significant performance benefits to parallel systems in which concurrent shared objects are employed. See generally, Greenwald, *Non-Blocking Synchronization and System Design*, PhD thesis, Stanford University Technical Report STAN-CS-TR-99-1624, Palo Alto, Calif., (1999); Greenwald and Cheriton, *The Synergy Between Non-Blocking Synchronization and Operating System Structure*, in 2*nd Symposium on Operating Systems Design and Implementation* (Oct. 28–31 1996), pp. 123–136. Seattle, Wash.; Massalin and Pu, *A Lock-free Multiprocessor OS Kernel*, Tech. Rep. TRCUCS-005-9, Columbia University, New York, N.Y., 1991; Arora, Blumofe and Plaxton, *Thread Scheduling for Multiprogrammed Multiprocessors*, in *Proceedings of the* 10*th Annual ACM Symposium on Parallel Algorithms and Architectures* (1998); and LaMarca, *A Performance Evaluation of Lock-Free Synchronization Protocols in Proceedings of the* 13*th Annual ACM Symposium on Principles of Distributed Computing* (Aug. 14–17 1994), pp. 130–140. Los Angeles, Calif. Because linked-lists are one of the most basic data structures used in modern program design, a simple and effective non-blocking linked-list implementation could serve as the basis for improving the performance of many data structures currently implemented using locks.

Valois presented a non-blocking implementation of linked-lists. See Valois, *Lock-Free Linked Lists Using Compare-and-Swap*, in *Proceedings of the Forteenth ACM Symposium on Principles of Distributed Computing*, Ottawa, Canada (August 1995). His implementation used compare-and-swap (CAS) operations and was highly distributed. However, it uses several specialized mechanisms for explicit GC, which can result in severe performance penalties. Furthermore, the implementation itself has never been proven to be linearizable even for simple set operations such as insert, delete, and find.

Indeed, Michael and Scott found various bugs in Valois' lock-free method, specifically the explicit memory management component. They corrected these bugs for a linked-list encoded queue implementation, but the resulting algorithm had the property that it could run out of memory easily under certain circumstances. See Michael and Scott, *Correction of a Memory Management Methodfor Lock-Free Data Structures*, TR599, Department of Computer Science, University of Rochester (December 1995). Michael and Scott later published another algorithm that overcomes the remaining memory leak problem. See Michael and Scott, *Simple, Fast, and Practical Non-Blocking and Blocking Concurrent Queue Algorithms in* 15*th ACM Symposium on Principles of Distributed Computing* (May 1996). However, these corrected implementations provide enqueue and dequeue operations on a linked-list encoded queue, rather than more flexible operations (such as insertion, deletion and find operations) in a set, multi-set, ordered set or other collection of elements encoded using a linked-list.

To overcome the complexity of building linearizable lock-free linked-lists using CAS, Greenwald advocated supporting a stronger DCAS operation in hardware, and presented a simple linearizable concurrent linked-list algorithm using DCAS. See Greenwald, *Non-Blocking Synchronization and System Design*, PhD thesis, Stanford University Technical Report STAN-CS-TR-99-1624, Palo Alto, Calif., (1999). His work was an extension of earlier DCAS based linked-list algorithms of Massalin and Pu, whose algorithms have the advantage of running in an environment without built-in garbage collection, but suffer the drawback of not being linearizable. See Massalin and Pu, *A Lock-free Multiprocessor OS Kernel*, Tech. Rep. TRCUCS-005-9, Columbia University, New York, N.Y., 1991.

Unfortunately, current multiprocessor architectures do not support powerful DCAS operations. Instead, support for simple CAS operations or LL/SC operation pairs is more typical. Accordingly, current techniques fail to provide a simple linearizable non-blocking implementation of linked-list suitable for the representation of sets, multi-sets, ordered sets or other collection of elements for which more flexible operations (such as insertion, deletion and find operations) are needed.

SUMMARY

It has been discovered that a simple and therefore highly usable non-blocking implementation of linked-lists can be provided using read, write and CAS operations. Several realizations of linked-list based data-structures are described, which are non-blocking, linearizable, and exhibit disjoint-access for most operations. In other words, the realizations are non-blocking and linearizable while maintaining the property that operations on disjoint parts of the list do not interact, effectively lowering contention and increasing concurrency. We implement three exemplary data structures: sets, multi-sets, and ordered-sets. The exemplary implementations support insert, remove, and find operations, with natural semantics. An ordered-set implementation supports an additional removeGE operation.

Some implementations in accordance with the present invention advantageously provide the behavior of a set on a computer system (either with multiple processors or a single processor that may be time-sliced in some manner), given the availability of linearizable CAS operations on an addressable memory of the customary sort. The set may be represented using a singly linked-list to avoid arbitrary restrictions on the total number of elements in the set and therefore to avoid preallocation of memory to contain the contents of the set.

Implementations in accordance with some embodiments of the present invention advantageously provide linearizable, non-blocking behavior for all three operations. Some implementations in accordance with the present invention avoid use of a "reserved value" that is not permitted to be inserted into the set. In addition, some implementations in accordance with the present invention advantageously limit interference between operations inserting different items into the set, or operations deleting different items from the set, or any combination of such operations.

In one embodiment in accordance with the present invention, a non-blocking concurrent shared object representation includes a linked-list of nodes encoding of a group of zero or more values and linearizable operations defined to implement semantics of at least insert and remove operations on the group. Concurrent execution of the linearizable operations is mediated using a first synchronization primitive to encode a marked node indication signifying logical deletion of a corresponding one of the values from the group. In some variations, concurrent execution of the linearizable operations is further mediated using a second synchronization primitive to physically excise the node corresponding to the logically deleted value. In some variation, the first and second synchronization primitives are compare and swap (CAS) operations. In various realizations, the group is a set, ordered set or a multi-set.

In another embodiment in accordance with the present invention, a method of managing access to a linked-list of nodes susceptible to concurrent operations on a group encoded therein includes separating deletion of a value from the group into at least two functional sequences. The first functional sequence performs a logical deletion of the value using a synchronization primitive to mark a corresponding one of the nodes. The second functional sequence excises the marked node from the linked-list.

BRIEF DESCRIPTION OF THE DRAWINGS

The present invention may be better understood, and its numerous objects, features, and advantages made apparent to those skilled in the art by referencing the accompanying drawings.

FIG. 4 depicts code in accordance with an exemplary embodiment of the present invention to perform a linearizable insert operation on a linked-list encoded set for which concurrent non-blocking execution is mediated using a Compare and Swap (CAS) synchronization primitive.

FIG. 5 depicts code in accordance with an exemplary embodiment of the present invention to perform a linearizable remove operation on a linked-list encoded set for which concurrent non-blocking execution is mediated using marked node construct and a CAS synchronization primitive.

FIG. 6 depicts code in accordance with an exemplary embodiment of the present invention to perform a linearizable find operation on a linked-list encoded set.

FIG. 7 depicts code in accordance with an exemplary embodiment of the present invention to perform a search operation employed in realizations of linearizable insert, remove and find operations and wherein a CAS synchronization primitive is employed to remove one or more marked nodes corresponding to values removed from a linked-list encoded set.

FIG. 8 depicts code in accordance with an exemplary embodiment of the present invention to perform a another linearizable remove operation (removeGE) on a linked-list encoded ordered set for which concurrent non-blocking execution is mediated using marked node construct and a CAS synchronization primitive.

FIG. 9 illustrates a limitation of certain implementations of an insert operation on a linked-list encoded ordered set.

FIG. 10 depicts code in accordance with an exemplary embodiment of the present invention to perform linearizable insert operation (insert2) on a linked-list encoded ordered set for which concurrent non-blocking execution is mediated using a CAS synchronization primitive.

The use of the same reference symbols in different drawings indicates similar or identical items.

Figure 1:
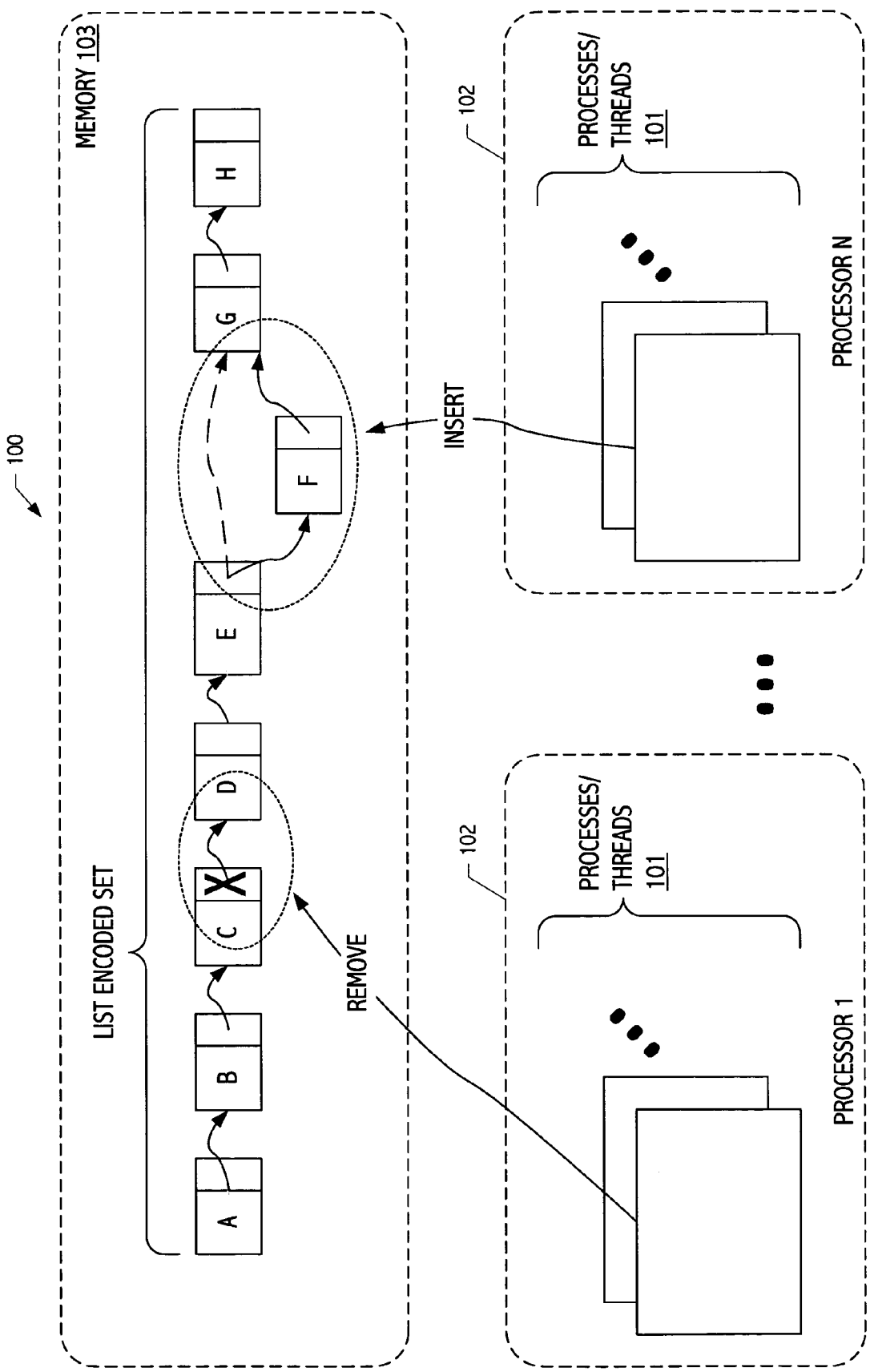
FIG. 1 illustrates results of disjoint concurrent insert and remove operations by execution processes or threads of a shared memory multiprocessor operating on a list encoded set in accordance with an embodiment of the present invention.

DESCRIPTION OF THE PREFERRED
EMBODIMENT(S)

The description that follows presents a set of techniques, objects, functional sequences and data structures associated with concurrent shared object implementations employing a compare-and-swap (CAS) primitive in accordance with an exemplary embodiment of the present invention. An exemplary non-blocking, linearizable implementation of a set using a linked-list-type data structure is illustrative. However, techniques, objects, functional sequences and data structures presented in the context of a concurrent set implementation will be understood by persons of ordinary skill in the art to describe support and functionality suitable for other collections of elements, such as ordered sets, multi-sets or other abstract data types that employ similar access semantics. Similarly, other synchronization primitives may be employed. Although use of a compare-and-swap (CAS) primitive is presently preferred, other primitives such as a locked load/store-and-compare (LL/SC) instruction pair may be employed in some variations. Based on the description herein, persons of ordinary skill in the art will appreciate suitable modifications to the techniques, objects, functional sequences and data structures described herein. In view of the above, and without limitation, the description that follows focuses on an exemplary linearizable, non-blocking concurrent set implementation that employs a compare-and-swap (CAS) primitive and behaves as if access operations on the set are executed in a mutually exclusive manner.

Non-Blocking, Linearizable Implementation of a Set

An important concrete data structure in computer science is the "linked-list" which includes a series of "nodes" each typically encoding a data item and a reference to a "successor" node in the list. The first node in the list is termed the "head" of the list, while the last node is termed the tail. Typically, the last node in the list is delimited by a special reference in its successor field. This special reference is typically a NULL value or a reference to a designated "sentinel node". In realizations that employ sentinel nodes, e.g., to identify either or both of the head and tail nodes, the sentinel nodes may or may not be instances of a node structure also employed to encode the body of the list.

Linked-lists are frequently used in the implementation of abstract data types. One important abstract data structure in computer science is the "set", which is a collection of items in which a given item appears at most once in the collection. A set supports at least the following three operations:

1. inserting an item into the set ("insert"),
2. deleting an item from the set ("remove"), and
3. testing whether an item is in the set ("find").

Various techniques may be used to specify an item to the "remove" and "find" operations. One approach is to supply a value from a set of totally-ordered "keys" with which items in the set may be compared. This ordering may be a natural property of the items (for example, alphabetical ordering between text strings), or an artificial property of the way the items are represented (for example, comparison between the memory addresses at which they are stored).

An "insert" operation is successful if and only if an equal item was not previously in the set. Conversely, a "remove" operation is successful if and only if it removes an equal item from the set. Similarly, a "find" operation is successful if and only if an equal item is contained in the set.

A linked-list may be used to represent the contents of a set. Typically, each node in the list contains a value representing one of the items contained in the set. The nodes are held, starting from the head of the list, in ascending order. This ordering makes it straightforward to avoid introducing duplicate items into the set, because such duplicates would be represented by consecutive nodes. It also allows efficient searching of the list through the use of auxiliary data structures as in the case of "skip lists".

Sometimes a linked-list structure is shared among multiple concurrent processes, thereby allowing communication amongst the processes. It is desirable that the data structure behaves in a linearizable fashion; that is, the data structure behaves as if the operations on it requested by various processes are performed atomically in some sequential order and that such operations appear to take effect at some point between their invocation and response.

One way to achieve linearizability is with a mutual exclusion lock (sometimes implemented as a semaphore). When any process issues a request to perform one of the three operations, the first action is to acquire the lock, which has the property that only one process may own it at a time. Once the lock is acquired, the operation is performed on the sequential list; only after the operation has been completed is the lock released. This approach clearly enforces the property of linearizability.

However, it is also desirable for operations on different items in the linked-list to interfere with one another as little as possible. Using a single mutual exclusion lock, it is impossible for one insertion to make progress while the data structure is locked for the purposes of performing another insertion of a different value. Ideally, operations acting on different items should not impede one another.

Certain computer systems provide primitive instructions or operations that perform compound operations on memory in a linearizable form (as if atomically). Most processor architectures provide at least one such primitive. For example, a "test-and-set" primitive has been provided in the IBM 360 architecture, a "fetch-and-add" primitive was provided on the NYU Ultracomputer, and a particular realization of a "compare-and-swap" primitive is provided in certain SPARC® architecture based processors available from Sun Microsystems, Inc, Mountain View, Calif. SPARC trademarks are used under license and are trademarks or registered trademarks of SPARC International, Inc. in the United States and other countries. Products bearing SPARC trademarks are based upon an architecture developed by Sun Microsystems.

Focusing illustratively on a typical "compare-and-swap" primitive, a CAS operation accepts three values or quantities: a memory address A, a comparison value C, and a new value N. The operation fetches and examines the contents V of memory at address A. If those contents V are equal to C, then N is stored into the memory location at address A, replacing V. Whether or not V matches C, V is returned or saved in a register for later inspection. The CAS is implemented in a linearizable, if not atomic, fashion. If the actual value "V" is not required by the programmer then such an operation may be notated as "CAS(A, C, N)". The result of the operation is "true" if "V" is equal to "C" and the result is "false" otherwise. Of course, persons of ordinary skill in the art will appreciate a variety of syntactic, operand/result format and other variations on the typical CAS implementation.

FIG. 1 illustrates a computer system 100 that includes one or more processors 102 that collectively execute one or more processes or threads (e.g., 101), concurrently and/or in a time-sliced fashion. The computer system includes or accesses a memory (e.g., memory 103) shared by the processor(s) and by the process(es) or threads. Part of the memory is used to store data related to maintaining a linked-list. The computer system supports at least three operations on the memory: read, write and CAS (compare-and-swap). A CAS operation, such as described above, allows a process to examine a memory location and, based upon its contents, to conditionally update the contents of that location, all as a single operation that is effectively indivisible as observed by any other process.

The computer system also includes hardware or software that directs one of several functional sequences that include read, write and CAS operations upon the shared memory. One such functional sequence inserts an item into a linked-list. For example, the value "F" may be inserted in the set {A,B, . . . ,E,G,H}, as illustrated by insert operation 112. A second such functional sequence removes an item from a linked-list. For example, the value "C" may be removed in the set {A,B,C,D, . . . }, as illustrated by remove operation 111. A third functional sequence examines a linked-list and determines if it contains a specified item. These functional sequences can be triggered or invoked by fetched instructions or by subroutine calls, for example, under the control of higher-level software. In some realizations, the functional sequences may be embodied as part of an application program, library or software object. In others, the functional sequences may be embodied as part of an execution environment or virtual machine.

For some realizations, it is important to consider that processes may proceed at very different rates of execution; in particular, some processes might be suspended indefinitely. In such circumstances, it is highly desirable for the implementation of a data structure to be "non-blocking" (also called "lock-free"); that is, if a set of processes are using it and an arbitrary subset of those processes are suspended indefinitely, it is always still possible for at least one of the remaining processes to make progress in performing operations on the data structure.

For some realizations, it is acceptable or desirable to assume that storage is managed by a "garbage collector" that periodically inspects the state of all processes and the contents of memory and arranges to recycle storage containing data structures for which it can be proven that no process will ever access that data in the future. Such a storage management scheme allows operations to allocate "new" data structures on the fly to hold newly inserted data items (rather than having to preallocate a fixed amount of memory), and to "free" such data structures simply by eliminating all references or pointers to such data structures from accessible variables and data structures.

Figure 2:
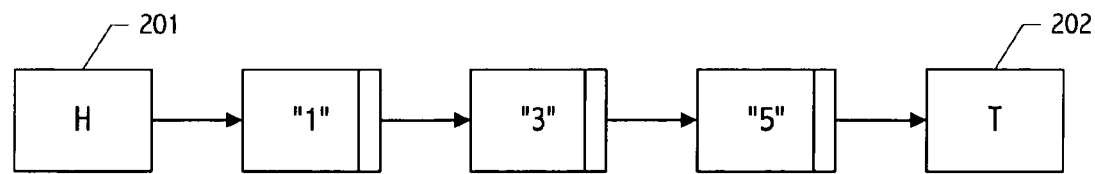
FIG. 2 depicts a linked-list data structure having a state that encodes a set {1,3,5}.

An exemplary realization of linked-list data structure is graphically illustrated in FIG. 2. The state illustrated encodes a set {1,3,5}. As typically represented, each node in the linked-list includes two fields (not explicitly shown). The first field may be termed the "key" field and holds one of the items stored in the list. The second field may be termed the "next" field and holds a reference to the successor of the node in the list. Of course, in some realizations additional indirection may be provided. For example, in some realizations, items need not be encoded by value, but rather by reference to another data structure. Similarly, although in some realizations, key values may themselves be elements of an encoded set, other realizations may separate keys and set elements. As with the data items, key values may be accessed indirectly by reference to another data structure rather than being stored directly in each node. Based on the description herein, persons of ordinary skill in the art will appreciate many suitable variations.

In the realization of FIG. 2, two sentinel nodes (namely head 201 and tail 202) delimit a chain of nodes that encode elements of the set. Sentinel nodes 201 and 202 are of any suitable structure; however, conceptually in a typical implementation, the key field of the head node may be viewed as containing a value that compares below all items that may be inserted in the set. Similarly, the key field of the tail node may be viewed as containing a value that compares above all items that may be inserted. Depending on the implementation, concrete values with these properties may or may not be employed to distinguish sentinel nodes. For example, exemplary functional sequences described below simply test pointers against known addresses for the head or tail sentinel, as appropriate. In one realization, an empty set is encoded as two sentinel nodes organized such that the "next" field of the head node refers to the tail node.

For the purpose of examples that follow, set values are taken to be integer keys and list encoded values are ordered according to the usual arithmetic rules. References between nodes of the linked-list that encodes a given set are memory references of the customary sort from the "next" field of one node to the memory address of the subsequent node in the list. Of course, other referencing constructs are also possible, including indices or pointers with less than full address space resolution.

In one embodiment in accordance with the present invention, references have at least two states, termed "marked" and "unmarked". Normally references are "unmarked" and, in particular, the references returned by a storage allocation function should typically be unmarked. A node is said to be "marked" if and only if the reference contained in its "next" field is "marked". A node becomes marked as part of a successful deletion operation on that node. The basic intuition behind this approach is that a node is "logically" deleted once it becomes marked and is later "physically" deleted (or excised) by modifying references so that the node is no longer in the chain of nodes reachable from the head. In an exemplary embodiment, "marked" and "unmarked" nodes are distinguished by stealing one of the low-order bits in the "next" field. However, realizations based on other marking constructs are also envisioned and described elsewhere herein.

Bit stealing realizations exploit storage alignment conventions of a particular implementation. In general, a memory address in a byte-indexed store is said to be "n-byte aligned" when the address is wholly divisible by "n". Certain computer systems favor the use of aligned memory addresses. These include, for example, the SPARC, Alpha, MIPS, Pentium and ARM families of processors. Some only allow memory to be accessed at suitably aligned addresses. Others implement aligned memory accesses more quickly than unaligned accesses.

When an address is aligned to a power of 2 then a number of "low-order bits" in its binary representation are zero. Typically addresses are 4-byte aligned (leaving 2 free low-order bits) or 8-byte aligned (leaving 3 free low-order bits). When one memory address is stored in a second memory location then these low-order bits can be "stolen" and used for various purposes so long as they are interpreted as zero when used to access the location indexed by the first address. For example, processor in accordance with the Alpha processor architecture provide special "LDx_U" and "STx_U" operations for discarding low-order bits which have been stolen in this way.

Exemplary Access Operations

An exemplary implementation of access operations on a set includes four functions, insert, remove, find and search. One realization of the insert operation is illustrated in FIG. 4. One realization of the remove operation is illustrated in FIG. 5. One realization of the find operation is illustrated in FIG. 6. A realization of the search function, which is used from within the exemplary realizations of insert, remove, and find operations, is illustrated in FIG. 7. Although the exemplary code of FIGS. 4–7 is styled as methods of an object type List with a C-type language syntax, persons of ordinary skill in the art will appreciate a wide variety of suitable implementations including object-oriented and procedural implementations as well as implementations suitable for specific language and/or execution environments.

In addition, several supporting functions are employed in the exemplary realizations. For example, a function is_marked_reference (r) returns true if and only if r is a marked reference. A function get_marked_reference (r) returns a marked reference to the object identified by r. Conversely, the function get_unmarked_reference (r) returns an unmarked reference to the object identified by r. In general, the supporting functions are of any design suitable to implement the marking construct. For example, in bit stealing realizations, the supporting functions test, set or clear the state of a low-order address bit (or bits). On the other hand, realizations that employ other marked node constructs may perform different, but analogous functions. For example, in a realization employing a dummy node construct, the supporting functions may test for presence of a dummy node in a reference chain, return a reference chain that includes a dummy node or remove a dummy node from a reference chain. In general, supporting functions are of any suitable design; however, for purposes of illustration, a bit-stealing construct is presumed.

Referring now to FIG. 7, the method List::search (hereafter search) is used by the illustrated realizations of insert, remove and find operations. The search operation takes a "search key" as a parameter and returns references to two nodes. These nodes are called the "left node" and the "right node" for the supplied key. In the illustrated realization, the search operation ensures that the returned nodes satisfy a number of conditions. First, the key of the "left" node is less than the search key and the key of the "right" node is greater than or equal to the search key. Second, both returned nodes are unmarked. Finally, the "right" node is the immediate successor of the "left" node. This last condition requires the search operation to remove marked nodes from the list so that the "left" and "right" nodes are adjacent. The search operation is implemented (e.g., as shown in FIG. 7) so that these conditions are satisfied at some point between the method's invocation and its completion.

The illustrated search operation can be understood as three sections. The first section 701 iterates over the nodes of the list until an unmarked node is found with a key greater than or equal to search_key. The found node is identified as right_node. During this traversal the search operation sets left_node to refer to the previous unmarked node that was found. The second stage 702 examines these nodes. If the node identified by left_node is the immediate predecessor of that identified by right_node, then the search operation returns. Otherwise, a third stage 703 of the illustrated search operation uses a linearizable synchronization operation to remove one or more marked nodes between the list nodes identified by left_node and right_node. Since a successful removal of one or more marked nodes may alter the list state, the excision attempt (i.e., the pointer update attempt at C1) is mediated by the linearizable synchronization operation (which in the illustrated realization is a CAS operation). Note that the list is susceptible to concurrent execution of other operations (including insert, remove and find operations, as well as other evaluations of a search operation). Accordingly, the excision attempt may fail, in which case the search is retried (at G2).

Referring now to FIG. 4, the illustrated realization of method List: insert (hereafter insert) operates as follows. The insert operation calls or invokes the above-described search operation to locate the pair of nodes between which a new node is to be inserted. Insertion of the new node employs a linearizable synchronization operation. As before, since a successful insertion of the new node may alter the list state, the insertion attempt (i.e., the pointer update attempt at C2) is mediated by a CAS operation. A successful CAS operation effectively swings the reference in left_node.next from the node identified by right_node to instead identify the newly inserted node node. As before, the list is susceptible to concurrent execution of other operations (including remove, find and search operations, as well as other evaluations of a insert operation).

Referring now to FIG. 5, the illustrated realization of method List::remove (hereafter remove) operates as follows. The remove operation calls or invokes the above-described search operation to locate the node (if any) to be removed, and then uses a two-stage process to perform the removal. The first stage 501 "logically deletes" the located node. While a variety of marked node encodings may be employed, in the illustrated realization, logical deletion is encoded by marking a reference associated with the logically deleted node. For example, in the illustrated realization of the remove operation, the CAS operation at C3 is employed to swap then current contents of a next node field (i.e., the reference encoded in right_node.next) for a marked version of same.

Figure 3A:
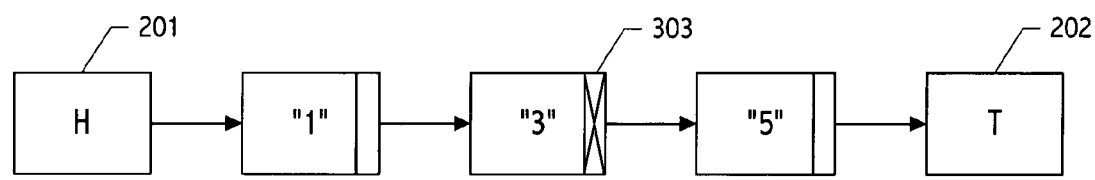
FIG. 3A depicts a linked-list data structure having a state that encodes a set {1,5} with a yet to be excised node indicated as deleted using an exemplary encoding.
Figure 3B:
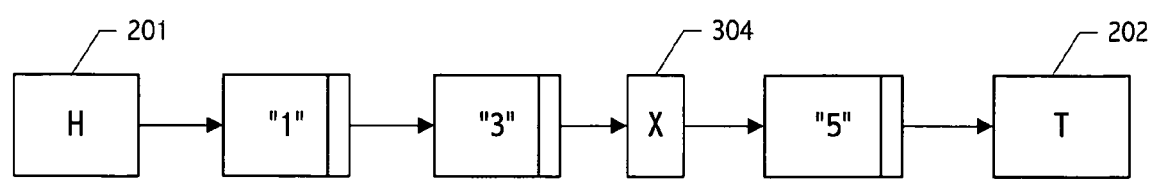
FIG. 3B depicts a linked-list data structure having a state that encodes a set {1,5} with a yet to be excised node indicated as deleted using a dummy node encoding.

Logical deletion of a node encoding the value "3" of a list encoding the set {1,3,5} is illustrated in FIG. 3A, wherein the pointer encoded in next field 303 is marked using any suitable method. As described above, a particular marked reference encoding may exploit address bits unused in a particular implementation or execution environment. Alternatively, other marked reference encodings may be employed. For example, as illustrated in FIG. 3B, a marked reference may point to a dummy node (e.g., dummy node 304) which itself points to the list node identified by the reference for which the marked reference is swapped.

Whatever the marked node encoding, a second stage (e.g., the second stage 502 of the illustrated realization of the remove operation) is employed to excise the logically deleted node from the list. In the illustrated realization, operation of the second stage ensures that the logically deleted node is physically excised before the remove operation returns. In general, physical excision may be performed directly by operation of a linearizable synchronization operation (illustratively, the CAS operation at C4), by a second invocation of the search operation (such as on failure of the CAS operation at C4) or as a byproduct of another operation (e.g., an independent execution sequence employing a remove or search operation).

Referring now to FIG. 6, the illustrated realization of method List::find (hereafter find) operates as follows. The find operation calls or invokes the above-described search operation and examines the node identified as right_node. If the identified node is not the tail of the list and has a corresponding value that matches the search_key, then the find operation returns a success indication.

While some aspects of linked-list implementations of a set with concurrent non-blocking insert and remove operations have been described with reference to realizations employing a bit-stealing marked node encoding, other realizations may avoid the use of a mark bit for representing marked references. This may be desirable for a number of reasons. First, in a given implementation or execution environment there may not be any low-order bits available, either because addresses are not subject to alignment constraints or because the low-order bits are already in use for other purposes. Second, the direct manipulation of a low-order bit in this way may not be possible from some high-level programming languages, such as the JAVA programming language. JAVA and all Java-based marks and logos are trademarks or registered trademarks of Sun Microsystems, Inc. in the United States and other countries. Third, the use of a low-order bit may entail pervasive changes to a language implementation and/or to a garbage collector.

Accordingly, as described above, dummy nodes may be used in place of marked bits. In realizations employing dummy nodes as a marked node encoding, an ordinary (unmarked) reference can be encoded as a direct reference stored in a source field and containing the memory address (or other reference information) of the target object. In contrast, a marked reference can be represented by an indirect reference stored in the source field which refers to a dummy node into which the ordinary reference information has been copied or displaced. In general, it must be possible to distinguish dummy nodes from ordinary nodes. While any of a variety of techniques is suitable, one particularly attractive technique for object-oriented programming language implementations is to make the class of the dummy node distinct from the class of a regular node. In this way the class of a referenced object can be used to discriminate between ordinary and marked references. An alternative, and more widely applicable, technique is to add a tag field to both kinds of nodes and to store different tag values in dummy nodes from regular nodes. Other techniques include use of a special and distinguishable storage location (e.g., a defined range of memory addresses) for dummy nodes.

Detailed Computational Model and Proofs

To facilitate an understanding of one particular realization in accordance with the present invention, more detailed description of a computational model follows. In addition, based on the computational model, several advantages and properties of the particular realization are demonstrated. In some cases, these advantages and properties are demonstrated in the form of a proof. As with most proofs, particular behaviors and properties are demonstrated based on invariants, i.e., attributes that are always or never true. Accordingly, the demonstration of advantages and properties of a particular implementation necessarily includes assertions of invariants, i.e., statement that for one very specific realization, certain things are always or never true or must be or behave in a certain way. Persons of ordinary skill in the art will appreciate that such assertions are particular to a specific realization. Other realizations in accordance with the present invention, including other realizations that exhibit the same or similar advantages and properties may violate some or all of the realization-specific invariants. Typically, other sets of invariants will be appropriate for a proof that these other realizations exhibit such advantages and/or properties.

In this regard, the claims that follow define the scope of the invention, not any realization-specific proof or invariants. Accordingly, a particular computational model and proof of certain properties is now provided without limitation on the variety of embodiments in accordance with the present invention. The proofs and particulars of an exemplary code implementation trace to design choices and should not be taken as limitations on the concurrent shared object technology described and claimed elsewhere herein. Many aspects of the proofs and exemplary code implementations are not essential to any particular embodiment of the concurrent shared object technology.

A concurrent system includes a collection of n processors. Processors communicate through shared data structures called objects. Each object has a set of primitive operations that provide the only means of manipulating that object. Each processor P can be viewed as a sequential thread of control, which applies a sequence of operations to objects by issuing an invocation and receiving the associated response. A history is a sequence of invocations and responses of some system execution. Each history induces a "real-time" order of operations where an operation A precedes another operation B if A's response occurs before B's invocation. Two operations are concurrent if they are unrelated by the real-time order. A sequential history is a history in which each invocation is followed immediately by its corresponding response. The sequential specification of an object is the set of legal sequential histories associated with it.

The basic correctness requirement for a concurrent implementation is linearizability, i.e., every concurrent history is "equivalent" to some legal sequential history that is consistent with the real-time order induced by the concurrent history. In a linearizable implementation, operations appear to take effect atomically at some point between their invocation and response. In our model, every shared memory location L of a multiprocessor machine's memory is a linearizable implementation of an object that provides every processor $P_i$ with the following set of sequentially specified machine operations:

$Read_i(L)$ reads location L and returns its value.
$Write_i(L, v)$ writes the value v to location L.
$CAS_i(L, o, n)$ is a compare-and-swap operation with the following semantics:
boolean CAS(val *addr, val old, val new1) {
  atomically {
    if (*addr == old) {
      *addr = new;
      return true;
    } else {
      return false;
    }
  }
}

We assume, based on current trends in computer architecture design, that CAS has longer latency than both a read or a write. We assume this is true even when operations are executed sequentially. We also assume the availability of a storage allocation mechanism as in Lisp and the JAVA programming language. The details of the allocator are not exposed to the user, yet it will be assumed that it includes an operation that allocates a new structure in memory and returns a pointer to it.

The implementations presented herein are non-blocking (also called lock-free). Let us use the term higher-level operations in referring to operations of the data type being implemented, and lower-level operations in referring to the (machine) operations in terms of which it is implemented. A non-blocking implementation is one in which any history containing a higher-level operation that has an invocation but no response must also contain infinitely many responses concurrent with that operation. In other words, if some higher level operation continuously takes steps and does not complete, it must be because some other invoked operations are continuously completing their response. This definition guarantees that the system as a whole makes progress and that individual processors cannot be blocked, only delayed by other processors continuously completing higher-level operations. Using locks would violate the above condition, hence the alternate name: lock-free.

Sequential Specification of Sets

A set object S is a concurrent shared object allowing each of n processors to perform three types of operation: Insert (k), Remove(k) and Find(k). Each parameter k is drawn from a set of keys. A concurrent implementation of a set object is one that is linearizable to a standard sequential set. The result of an Insert, a Remove or a Find is a Boolean value indicating success or failure. For purposes of illustration and correctness proofs, we require that a correct implementation of a set meet the following sequential specification:

Consider a sequence of operation invocations $op_0$, $op_1$, $op_2$, ... Let $I_m$ be the set of inserted items immediately prior to $op_m$. $I_m$ is defined inductively and $I_0=\emptyset$.

Suppose $op_m$ is of the form Insert(k). If $k \in I_m$, then the insertion is unsuccessful, $I_{m+1}=I_m$ and the result of the Insert operation is false. If $k \notin I_m$, then the insertion is successful, $I_{m+1}=I_m \cup \{k\}$ and the result of the Insert operation is true.

Suppose $op_m$ is of the form Remove(k). If $k \in I_m$, then the deletion is successful, $I_{m+1}=\{\chi \in I_m : \chi \neq k\}$ and the result of the Remove operation is true. Otherwise, the deletion is unsuccessful, $I_{m+1}=I_m$ and the result of the Remove operation is false.

Finally, suppose $op_m$ is of the form Find(k). If $k \in I_m$, then operation is successful and the result of the Find operation true. Otherwise, the operation is unsuccessful and the result of the Find operation is false. In either case, $I_{m+1}=I_m$.

We also consider the problem of implementing non-blocking linearizable ordered sets. These are concurrent shared objects having the same sequential specification as above, with an added operation of the form removeGE(k) that removes an item greater or equal to an input key k. That is, let $I_m|k=\{\chi \in I_m : \chi \geq k\}$. If $I_m|k=\emptyset$, then the deletion is unsuccessful, $I_{m+1}=I_m$ and the result of the removeGE operation is T, some value distinct from all keys. Otherwise, the deletion is successful. Let k' be the smallest element of $I_m|k$. $I_{m+1}=\{\chi \in I_m : \chi \neq k'\}$. The result of the removeGE operation is k'.

Exemplary Implementation

To simplify the presentation, we will assume that the keys are totally ordered. The set is represented concretely by an instance of the class List, which contains a singly linked-list of instances of the class Node. An instance of the List class contains two fields which identify the head and the tail. An instance of the Node class contains two fields which identify the key and successor of the node. For purposes of illustration and correctness proofs, class Node may be defined as follows:

```
class Node {
    KeyType key;
    Node *next;
public:
    Node(KeyType _key) : next(NULL), key(_key) { }
}
``` and class List may be defined as follows:

```
class List {
    Node *head;
    Node *tail;
public:
    List( ) {
        head = new Node( );
        tail = new Node( );
        head→next = tail;
    }
}
```

Each node represents one of the keys contained in the set. The list is held in ascending order with sentinel head and tail nodes. Each node in the list contains a distinct key value. The key fields in the sentinel nodes are not accessed, but conceptually the key of the head is less then any value of KeyType and the key of the tail is greater than any value of KeyType.

The reference contained in the next field of a node may be in one of two states: marked or unmarked. A node is said to be marked if and only if its next field is marked. Intuitively, a marked node is one which should be ignored because some process is deleting it. Marked references are distinct from normal references but still allow the referred-to node to be determined. They may be implemented using a low-order bit in each reference as a mark bit or by using an extra level of indirection in which marked references are accessed through dummy nodes. A dummy node is a special kind of node which may be distinguished at run-time from an ordinary node. For example, in the Java programming language, dummy nodes may be instances of a subclass of the ordinary node class. Dummy nodes do not contain keys and, when linked in the list, are placed directly between pairs of ordinary nodes. A node is marked if and only if it has a dummy node as its successor. A node becomes logically deleted when it is marked. A node becomes physically deleted when it is unlinked and is therefore no longer reachable from the head of the list.

Properties of Concurrent Implementation

The following invariants are maintained by the concurrent implementation.
1. The data structure reachable from the head is only updated by CAS operations. Note that the only other updates to fields occur within the constructors of Node and List, and before a new node has been linked into the list.
2. The key field is constant once initialized. Note that the only assignment to field key occurs within the constructor of Node.
3. The value of the next field is constant once it contains a marked reference. Consider each of the CAS operations in turn:

In the illustrated implementation of the search operation (see FIG. 7), the CAS operation at C1: The value in the local variable t_next was unmarked when it was used to initialize left_node_next.

In the illustrated implementations of the insert and remove operations (see FIGS. 4 and 5), the CAS operations at C2 and C4: The value in the local variable right_node is a reference to the right node returned by search. Each return path in search ensures that it returns an unmarked reference.

In the illustrated implementation of the remove operation (see FIG. 5), the CAS operation at C3: The value in the local variable right_node_next is found to be unmarked immediately before the CAS.

4. Nodes are not re-ordered within the list. Consider, in turn, each of the CAS instructions from the various set operations:

In the illustrated implementation of the search operation (see FIG. 7), the CAS operation at C1: A reference in the field (*left_node)→next to left_node_next is swung to refer to right_node. The value in right_node is obtained from left_node_next by following a chain of marked references read from next fields. These are constant (as illustrated by invariant 3, above) and therefore the effect of the CAS operation at C1 is to remove a series of marked nodes.

In the illustrated implementation of the insert operation (see FIG. 4), the CAS operation at C2: A reference in the field left_node→next to right_node is swung to refer to new_node. The new_node is thread-local before the CAS operation at C2 and its next field is initialized to refer to right_node. Therefore the effect of the CAS operation at C2 is to insert a single node.

In the illustrated implementation of the remove operation (see FIG. 5), the CAS operation at C3: A reference in the field right_node→next is changed from an unmarked reference to a marked reference. The node it refers to is unchanged.

In the illustrated implementation of the remove operation (see FIG. 5), the CAS operation at C4: A reference in the field left_node→next to right_node is swung to refer to right_node_next. Note that right_node→next is the immediate successor of right_node. Therefore the effect of the CAS operation at C4 is to remove a single marked node.

5. Nodes are linked in the correct order. As shown above, all nodes are linked into the list at the CAS operation at C2. A node is inserted immediately between left_node and right_node. The post-conditions of search guarantee that left_node.key < key < right_node.key. As a further consequence, all nodes reachable from the head have distinct key values.

6. Nodes are marked before they become unreachable from the head. Note that the CAS operations that may unlink nodes (i.e., the CAS operations at C1 and C4) remove nodes that have previously been found to contain marked references and therefore (as illustrated by invariant 3, above) are marked at the point of unlinking.

7. Search post-conditions. There is some point during the execution of the List::search method at which the nodes referred to by left_node and right_node satisfy the following conditions simultaneously:
left_node.key < search.key ≦ right_node.key;
left_node.next = right_node;
left_node is unmarked; and
right_node is unmarked.

For the first condition, note that when right_node is initialized the preceding do . . . while loop has ensured that search_key ≦ right_node.key. Similarly left_node.key < search_key because otherwise the loop would have terminated earlier. As illustrated by invariant 2, above, the key field is constant once initialized. For the second and third conditions we must separately consider each return path.

If List::search returns at return R1, then the test guarding the return statement ensures that right_node was the immediate successor of left_node when the next field of that node was read into the local variable t_next during the do . . . while loop in the first phase of List::search. Note that the same value of t_next is found to be unmarked before initializing left_node.

If List::search returns at return R2, then the CAS operation at C1, guarding the return statement, ensures that (*left_node)→next contains an unmarked reference to right_node.

For the fourth condition, observe that both return paths confirm that the right node is unmarked after the point at which the first three conditions must be true. As illustrated by invariant 3, above, we may deduce that the right node was unmarked at that earlier point.

8. Operations cause at most two updates. All updates to the data structure reachable from the head are performed by CAS instructions (as illustrated by invariant 1, above). We will show that each successful insertion causes exactly one update, that each successful deletion causes at most two updates and that unsuccessful operations do not cause any updates. The updates that physically delete items from the list may be performed by a processor in the course of any operation. However, such updates are caused by the logical deletion of a node and occur in place of a successful CAS in that operation. Consider each of the CAS instructions in turn:

In the illustrated implementations of the search and remove operations (see FIGS. 7 and 5), the CAS operations at C1 and C4 each succeed only by unlinking marked nodes from the structure reachable from the head of the list. Therefore, the number of times that these CAS instructions succeed is bounded above by the number of nodes that have been marked. Exactly one node is marked during each successful logical deletion by the CAS operation at C3 and therefore at most one update may be performed the CAS operations at C1 and C4 for each successful logical deletion.

In the illustrated implementation of the insert operation (see FIG. 4), the CAS operation at C2 succeeds exactly once on the return path from a successful insertion.

Points of Linearization

We now proceed to define a correct linearization order. Consider the operation which will occur as $op_m$ in this order. Note that although we refer to $op_m$ in the construction of the linearization order, this is solely to refer unambiguously to individual operations. We do not, of course, rely on the ordering between the m when defining linearization points. We could alternatively, and more verbosely, refer to each operation as $op_{i,m}$ to denote the $m^{th}$ operation performed by processor i. Let $d_m$ be the real-time at which the List::search post-conditions are satisfied for $op_m$. Each operation invokes List::search and therefore $d_m$ is defined for all $op_m$. These $d_m$ identify the times at which the outcome of the operations become inevitable.

Where $op_m$ is a successful insertion or deletion, let $u_m$ be the real-time at which the corresponding update is performed to the data structure. For a successful insertion, this will be the execution of the CAS operation at C2. For a successful deletion this will be the logical deletion of the node at the execution of the CAS operation at C3.

We shall map each operation to a real-time linearization point within its execution and employ the conventional ordering between these times to define the linearized order. Let $I_m$ be the linearization time for $op_m$. Then:
if $op_m$ is a successful insertion or a successful deletion, then $l_m=u_m$, otherwise $l_m=d_m$.

The intuition in the case of a successful insertion is that the CAS at $u_m$ ensures that the left node is still unmarked and that the right node is still its successor. The right node may, of course, have become marked between $d_m$ and $u_m$ but, since we are considering a successful insertion, the key of the right node must be strictly greater than the key being inserted.

The intuition in the case of a successful deletion is that the CAS at $u_m$ serves two purposes. First, it ensures that the right node is still unmarked immediately before the update. Second, the update itself marks the right node and therefore makes the deletion visible to other processors.

The intuition in the case of a successful find is that, at $d_m$, the right node was unmarked and contained the search key. Finally, in the case of unsuccessful operations, the information obtained at $d_m$ provides evidence that condemns the operation to failure. For an unsuccessful insertion it exhibits a node with a matching key. For an unsuccessful deletion or find it exhibits the left and right nodes that (respectively) have keys strictly less-than, and strictly greater-than, the search key.

We shall proceed more formally by establishing that in any sequential history the implemented List::insert, List::remove and List::find operations return values consistent with the sequentially specified algorithm.

Our proof is divided into three sections which establish:

P1. that in the sequential specification, the result of an operation depends only on the key k passed to the operation and on whether $k \in I_m$, P2. that in the concurrent implementation, the key of the right node is equal to the search key if and only if that key is in $I_m$, and P3. that the operations by which the concurrent implementations of List::insert, List::remove and List::find derive their results from the key of the right node are consistent with the sequential specification.

Results in the Sequential Specification Depend on a Single Key

First, suppose that $op_m$ is an operation Insert(k). If $k \in I_m$, then the insertion is unsuccessful. Otherwise $k \notin I_m$ and the insertion is successful. Second, suppose that $op_m$ is an operation Remove(k). If $k \in I_m$, then the deletion is successful. Otherwise $k \notin I_m$ and the deletion is unsuccessful. Finally, suppose that $op_m$ is an operation Find(k). If $k \in I_m$ then the find is successful. Otherwise, $k \notin I_m$ and the find is unsuccessful. Hence we have proven P1.

The Concurrent Implementation Finds the Same Key

Define $N_m$ to be the set of unmarked nodes reachable from the head of the list at the linearization point of $op_m$. If $op_m$ is an insertion linearized at the CAS operation at C2 or a deletion linearized at the CAS operation at C3, then $N_m$ is the state of the list immediately prior to that CAS operation. Note that, for $N_m$, we are not concerned with the other CAS instructions because they only unlink marked nodes and consequently have no effect on $N_m$.

We wish to show that $(k \in I_m) \leftrightarrow (\exists nd:(nd.key=k) \wedge (nd \in N_m))$. We shall proceed by induction on m. In the base case $I_0 = M_0 = \emptyset$. Now consider the effect of $op_{m-1}$, a successful insertion or successful deletion. These updates occur at the linearization points of the operation. Furthermore, since they are the only updates which affect $N_m$, operations have no visible effects in a concurrent execution before their linearization points.

If $op_{m-1}$ was a successful insertion, then at $l_{m-1}$ an unmarked node with the inserted key was linked into the list. This inserts the node into L and, in the sequential specification, inserts the key into L The node cannot become marked after its insertion but before $op_m$ because marking occurs only at the linearization points of successful deletions.

If $op_{m-1}$ was a successful deletion, then at $l_{m-1}$ an unmarked node was marked. This removes the deleted node from L and, in the sequential specification, removes the key of the deleted node from I. A node with this key cannot be inserted after this deletion but before $op_m$ because unmarked nodes are only introduced at the linearization points of successful insertions.

We have shown that at an operation's linearization point, the set of unmarked nodes reachable from the head ($N_m$) is consistent with the set of keys contained in the set ($I_m$). We now show that the key of the right node returned by List::search in $op_m$ is equal to the search key if and only if that key is in $I_m$.

For find operations, unsuccessful insertions and unsuccessful deletions, the linearization point is the point at which the search post-conditions are satisfied. As illustrated by invariant 7, above, left_node.key<search_key $\leq$ right_node.key,
left_node.next = right_node,
left_node $\in N_m$, and
right_node $\in N_m$.

As illustrated by invariant 5, above, the key of the right node must be the smallest key that is greater than or equal to the search key in an unmarked node. Therefore right_node.key is the smallest key in $I_m$ that is greater than or equal to the search key and so right_node.key is equal to the search key if and only if that key is in $I_m$.

For a successful insertion, the linearization point is the CAS operation at C2. This occurs after the point at which the search post-conditions were satisfied. The if statement preceding the CAS operation at C2 tests that the key of the right node is not equal to the search key. The key must not have changed (as illustrated by invariant 2, above). A separate node with a key equal to the search key cannot have been inserted and remained un-deleted because the CAS ensures that the successor of the left node has not changed. Therefore the search key is not in $I_m$ immediately prior to the linearization point of a successful insertion.

For a successful deletion, the linearization point is the CAS operation at C3. This is after the point at which the search post-conditions were satisfied. However, the comparison performed during the CAS ensures that the right node is not marked. The if statement preceding the CAS operation at C3 ensures that the key of the right node is equal to the search key. The key must not have changed (as illustrated by invariant 2, above). The node must not have been deleted by another process because the CAS ensures that the node is not marked. Therefore the search key is in $I_m$, immediately prior to the linearization point of a successful deletion.

We have shown that the key of the right node returned by List::search in $op_m$ is equal to the search key if and only if that key is in $I_m$.

Concurrent Implementation Computes the Same Result

Observe that the implementation of the List::insert operation returns true if and only if the key of the right node is not equal to the search key. As shown for P1, an insertion in the sequential specification succeeds if and only if the search key is not in $I_m$. Similarly, the implementations of List::remove and List::find return true if and only if the key of the right node is equal to the search key. As shown for P1, a deletion or find operation in the sequential specification succeeds if and only if the search key is in $I_m$. Hence we have proven P3.

Progress

We will show that the concurrent implementation is non-blocking. That is, if some process takes infinitely many steps in the execution of a List::insert, List::remove, List::find method then other processes must complete infinitely many insertion, deletion or find operations. In fact, we shall prove a stronger property, that other processes must complete infinitely many successful insertions or successful deletions.

We proceed by noting that there are no recursive or mutually-recursive method definitions and therefore consider each of backward branch in turn:

Referring to the search operation illustrated in FIG. 7, each time the backward branch at B1 is taken, the local variable t is advanced one node down the list. The list always contains the unmarked tail node and the successive nodes visited have strictly larger keys.

Each time the backward branch at B2 is taken, the CAS operation at C1 has failed and therefore the value of (*left_node)→next≠left_node_next. The value of the field must have been modified since it was read during the loop ending at backward branch at B1. Modifications are only made by successful CAS instructions and each operation causes at most two successful CAS instructions.

Referring to the insert and remove operations illustrated in FIGS. 4 and 5, each time the backward branch at B3 or B4 is taken the corresponding CAS operation at C2 or C3 has failed, and therefore left_node.next did not contain an unmarked reference to right_node. The value must have been modified since it was read in List::search and, as with the backward branch at B2, at most two updates may occur for each operation.

Referring to the search operation illustrated in FIG. 7, each time the branch at G1 or G2 is taken, then a node which was previously unmarked has been marked by another processor. As before, at most two updates may occur for each operation.

Ordered Sets

Now we consider the problem of implementing non-blocking linearizable ordered sets. Such implementations include a fourth operation, e.g., of the form removeGE(k), in addition to the three defined above. Let $I_m|k=\{\chi \in I_m : \chi \geq k\}$. If $I_m|k=\emptyset$, then the deletion is unsuccessful, $I_{m+1}=I_m$ and the result of the removeGE operation is T; some value distinct from all keys. Otherwise, the deletion is successful. Let k' be the smallest element of $I_m|k$. $I_{m+1}=\{\chi \in I_m : \chi \neq k'\}$. The result of the removeGE operation is k'.

One implementation of the removeGE operation is shown in FIG. 8. It is tempting to provide the desired behavior by modifying the implementation so that the test at T1 does not fail if the key of the right node is greater than the search key. Unfortunately, such an implementation is not linearizable.

Figure 9:
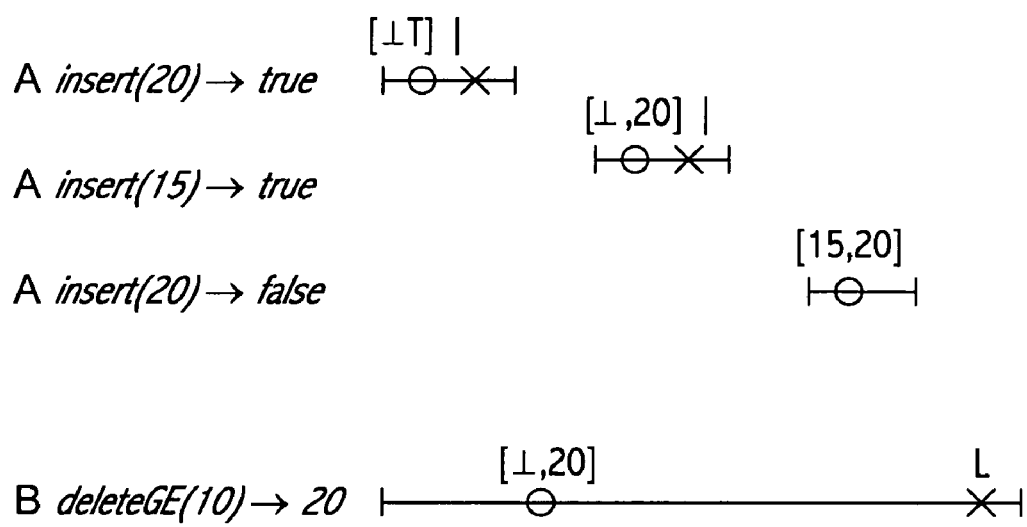
FIG. 9 illustrates operations including a removeGE operation on a linked-list encoded ordered set in accordance with an exemplary embodiment of the present invention. In particular.

Consider the sequence of operations illustrated in FIG. 9. Each line in FIG. 9 represents the real-time interval of the invocation of one of the operations. The points marked with crosses indicate the successful CAS operations performed by a respective insertion or deletion. Crosses are labeled I or L according to whether they correspond to an insertion (by the CAS operation at C2, see FIG. 4) or to a logical deletion (by the CAS operation at C5, see FIG. 8). Circles indicate the points at which the post-conditions of List::search were satisfied. They are labeled with pairs, such as [⊥,20], which indicate the keys of the left and right nodes returned by that method. The symbols ⊥ and T stand for the keys of the head and tail of the list respectively. For purposes of illustration, the ordered set encodes integers with the usual arithmetic ordering.

First, suppose that the three insertion operations are executed in isolation. The set is initially empty. The value 20 is inserted successfully. The value 15 is inserted successfully. A second attempt to insert 20 fails because that key is already in the set. Now consider a concurrent removeGE(10) operation that attempts to remove any node with a key greater than or equal to 10. Concurrent execution may proceed as follows:

The removeGE operation calls or invokes the search operation between the first insertion of 20 and the subsequent insertion of 15.

The search operation finds the head of the list as the left node and a node containing 20 as the right node.

The insertion of 20 is unsuccessful because the insert operation observes that 15 is the key of its left node and 20 is the key of its right node.

The removeGE(10) operation completes by logically deleting the node containing 20.

We must assign a linearization point to this removeGE (10) operation such that the result, 20, is the smallest key in the set that is greater than or equal to 10. This requires it to be linearized before the insertion of 15. Otherwise, the key 15 should have been returned in preference to 20. However, we must also linearize the deletion after the failed insertion of 20. Otherwise, that insertion would have succeeded. These constraints are irreconcilable.

Intuitively, the problem is that, at the execution of the CAS operation at C5, the right node need not be the immediate successor of the left node. This was acceptable when considering the basic remove operation because we were only concerned with concurrent updates affecting nodes with the same key. Such an update must have marked the right node and so the CAS operation at C3 would have failed. In contrast, during the execution of the removeGE operation, we must be concerned with updates to any nodes whose keys are greater than or equal to the search key.

One direct attempt to address this problem is to change the CAS operation at C3 into an atomic double-compare-and-swap (DCAS) operation. In addition to comparing right_node→next against right_node_next, such a DCAS mediated alternative implementation would compare left_node→next against right_node. It would therefore fail if the right node was no longer the direct successor of that left node—for example, if a node had been inserted between the right and left nodes. If the DCAS operation fails for that second reason then the subsequent re-invocation of the search operation would select new left and right nodes. Such an implementation linearizes at the DCAS operation.

An alternative is to retain the removeGE implementation of FIG. 8 and to redefine the correct behavior of removeGE so that it may return any key in the set that is greater than or equal to the search key. Such an implementation linearizes at the CAS operation at C5.

A further alternative is to retain the removeGE implementation of FIG. 8, but to change the implementation of the insert operation in such a way that the CAS operation at C5 must fail whenever a new node may have been inserted between the left and right nodes. This would mean that at the CAS operation at C5, the key of the right node must still be the smallest key that is greater than or equal to the search key.

FIG. 10 illustrates the modified implementation (List::insert2). A CAS operation at C7 is a special case that provides insertion before the tail in the same way as the original insert method (recall FIG. 4), i.e., the tail node cannot be removed by operation of removeGE.

Figure 11A:
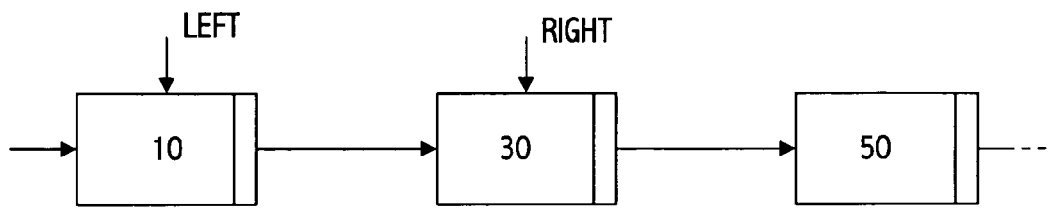
FIGS. 11A, 11B and 11C illustrates successive intermediate states during execution of a linearizable insert operation (insert2) on a linked-list encoded ordered set in accordance with an embodiment of the present invention.
Figure 11B:
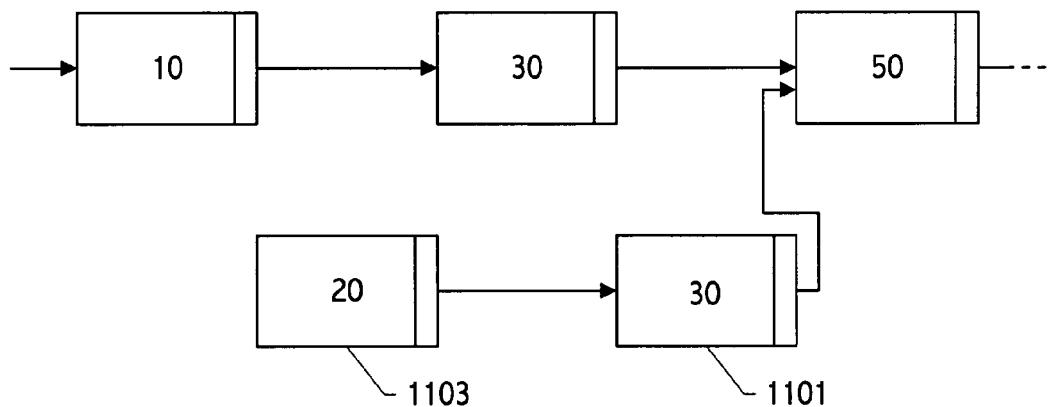
Figure 11C:
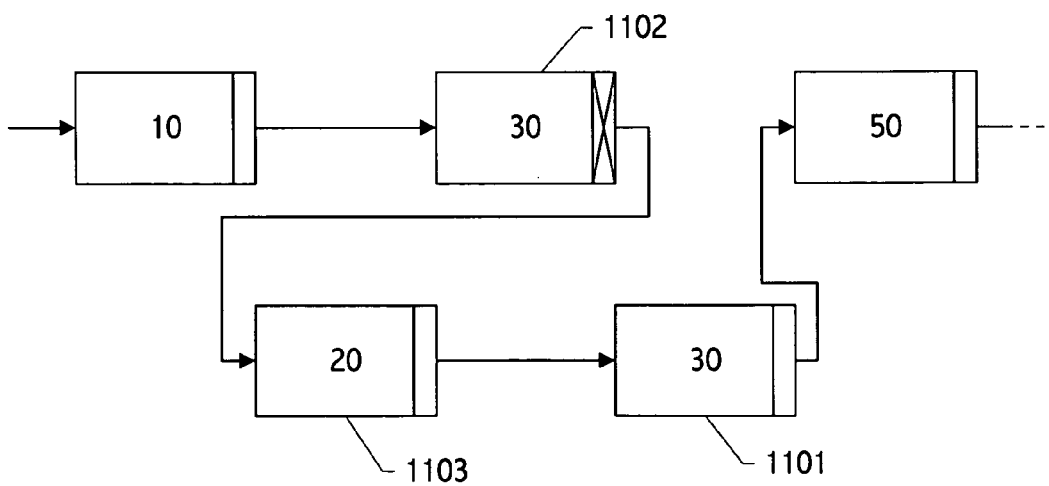

FIGS. 11A, 11B and 11C illustrates a sequence of stages of the modified insertion operation (insert2) through completion of the CAS operation at C8. The list initially contains at least three unmarked nodes with keys 10, 30 and 50 respectively. An Insert (20) operation is attempted. As with the original insert operation (recall FIG. 4), once the left and right nodes have been found, the next stage is to create a new node 1103 containing the intended key. However, as shown in FIG. 11B, insert2 also creates a duplicate 1101 of the right node. The insertion is completed by the CAS operation at C8, which changes the next field of the right node to contain a marked reference 1102 to new node 1103.

The CAS operation at C8 has two effects. First, it inserts the new node into the list. Before completion of the CAS operation at C8, the next field of the right node is unmarked, and therefore the right node must still be the successor of the left node. Second, by marking the contents of the next field of the right node, the CAS operation at C8 causes any concurrent execution of removeGE with the same right node to fail. Note that the key of the now-marked right node is not in the correct order. However, the implementations of the search, remove, find and removeGE operations advantageously do not depend on the correct ordering of marked nodes.

OTHER EMBODIMENTS

While the invention has been described with reference to various embodiments, it will be understood that these embodiments are illustrative and that the scope of the invention is not limited to them. Many variations, modifications, additions, and improvements are possible. Plural instances may be provided for components described herein as a single instance. Finally, boundaries between various components, operations and data stores are somewhat arbitrary, and particular operations are illustrated in the context of specific illustrative configurations. Other allocations of functionality are envisioned and may fall within the scope of claims that follow. Structures and functionality presented as discrete components in the exemplary configurations may be implemented as a combined structure or component. These and other variations, modifications, additions, and improvements may fall within the scope of the invention as defined in the claims that follow.

What is claimed is:

1. A non-blocking concurrent shared object representation encoded in a computer-readable medium, comprising:
    a linked-list of nodes encoding of a group of zero or more values; and
    linearizable operations defined to implement semantics of at least insert and remove operations on the group, wherein concurrent execution of the linearizable operations is mediated using a first synchronization primitive to encode a marked node indication signifying logical deletion of a corresponding one of the values from the group, wherein the first synchronization primitive atomically examines and updates a single target, the updating being conditional on the examination.

2. The non-blocking concurrent shared object representation of claim 1,
    wherein concurrent execution of the linearizable operations is further mediated using a second synchronization primitive to physically excise the node corresponding to the logically deleted value.

3. The non-blocking concurrent shared object representation of claim 2,
    wherein the first and second synchronization primitives include compare and swap (CAS) operations and load lock/store-and-compare operations.

4. The non-blocking concurrent shared object representation of claim 2,
    wherein reclamation of storage associated with the excised node is independent of the linearizable operations.

5. The non-blocking concurrent shared object representation of claim 1,
    wherein the linked-list of nodes is free of reference count storage for coordination of garbage collection.

6. The non-blocking concurrent shared object representation of claim 1,
    wherein traversal of the concurrent shared object is without atomic update of a garbage collection coordination store.

7. The non-blocking concurrent shared object representation of claim 1,
    wherein the node corresponding to the logically deleted value is physically excised from the linked-list by an execution sequence corresponding to one of:
        an instance of the remove operation that performed the logical deletion;
        an instance of the remove operation that did not perform the logical deletion; and
        an instance of the insert operation.

8. The non-blocking concurrent shared object representation of claim 1,
    wherein the linearizable operations further implement semantics of a find operation.

9. The non-blocking concurrent shared object representation of claim 1,
    wherein the values of the group are stored in respective ones of the nodes.

10. The non-blocking concurrent shared object representation of claim 1,
    wherein the values of the group are represented in storage reachable from respective ones of the nodes.

11. The non-blocking concurrent shared object representation of claim 1,
    wherein the values of the group are represented in storage identified by respective ones of the nodes.

12. The non-blocking concurrent shared object representation of claim 1,
    wherein the marked node indication includes a distinguishing pointer value.

13. The non-blocking concurrent shared object representation of claim 1,
    wherein the marked node indication includes a distinguishing bit value in an otherwise unused portion of a next node pointer of the logically deleted node.

14. The non-blocking concurrent shared object representation of claim 1,
    wherein respective next node pointers of those of the nodes corresponding to current values of the group directly reference respective other ones of the nodes; and
    wherein the marked node indication includes a distinguishing additional level of indirection between the next node pointer of the logically deleted node and a respective other one of the nodes.

15. A non-blocking concurrent shared object representation encoded in a computer-readable medium comprising:
    a linked-list of nodes encoding of a group of zero or more values; and
    linearizable operations defined to implement semantics of at least insert and remove operations on the group, wherein concurrent execution of the linearizable operations is mediated using a first synchronization primitive to encode a marked node indication signifying logical deletion of a corresponding one of the values from the group, wherein the first synchronization primitive atomically examines and updates a single target, the updating being conditional on the examination,
    wherein successful completion of an insertion into the group requires, at most, one atomic update of the concurrent shared object;
    wherein successful completion of a deletion from the group requires, at most, two atomic updates of the concurrent shared object; and
    wherein mere traversal of the concurrent shared object is without atomic update of the concurrent shared object.

16. A method of managing access to a linked-list of nodes susceptible to concurrent operations on a group encoded therein, the method comprising:
    separating deletion of a value from the group into at least two functional sequences;
    the first functional sequence performing a logical deletion of the value using a synchronization primitive to mark a corresponding one of the nodes; and
    the second functional sequence excising the marked node from the linked-list,
    wherein the synchronization primitive atomically examines and updates a single target, the updating being conditional on the examination.

17. The method of claim 16,
    wherein the logical deletion and the marked node excision are performed as part of a single deletion operation operating upon the value.

18. The method of claim 16,
    wherein the logical deletion is performed as part of a deletion operation operating upon the value; and
    wherein the marked node excision is performed as part of another operation.

19. The method of claim 18,
    wherein the another operation is an insert operation.

20. The method of claim 18,
wherein the another operation is a remove operation operating upon another node.

21. The method of claim 16,
wherein the synchronization primitive includes a compare and swap (CAS) operation or a load lock/store-and-compare operation.

22. The method of claim 16, further comprising:
after the logical deletion but before the marked node excision, traversing, as part of an access operation, the linked-list including the marked node.

23. The method of claim 16,
wherein the group is an ordered set; and
wherein the linearizable operations implement semantics of a remove operation selective for a value, if any, of the group based on comparison with a specified value.

24. The method of claim 23,
wherein the ordered set is organized in increasing value order; and
wherein the remove operation is selective for a value, if any, of the group greater than or equal to the specified value.

25. A computer program product encoded in at least one computer readable medium, the computer program product comprising:
at least two functional sequences providing non-blocking access to a concurrent shared object, the concurrent shared object instantiable as a linked-list of nodes encoding of a group of zero or more values;
a first of the functional sequences defined to implement semantics of an insert operation on the group; and
a second of the functional sequences defined to implement semantics of a remove operation on the group,
wherein instances of the functional sequences are linearizable and concurrent execution thereof by plural processors of a multiprocessor is mediated using a synchronization primitive to encode a marked node indication signifying logical deletion of a corresponding one of the values from the group with separate physical excision of the corresponding node, wherein the synchronization primitive atomically examines and updates a single target, the updating being conditional on the examination.

26. The computer program product as recited in 25,
embodied as a software component combinable with program code to provide the program code with linearizable, non-blocking access to the concurrent shared object.

27. The computer program product as recited in 25,
embodied as a program executable to provide linearizable, non-blocking access to the concurrent shared object.

28. The computer program product as recited in 25,
wherein the at least one computer readable medium is selected from the set of a disk, tape or other magnetic, optical, or electronic storage medium.

29. An apparatus comprising:
plural processors;
one or more data stores addressable by each of the plural processors;
means for coordinating concurrent execution, by ones of the plural processors, of at least insert and remove operations on a group of zero or more values encoded in the one or more data stores, the coordinating employing a first synchronization primitive to encode an indication signifying logical deletion of a corresponding one of the values from the group and a second synchronization primitive to physically excise the node corresponding to the logically deleted value, wherein the synchronization primitives atomically examine and update their respective single targets, the updating being conditional on the examination; and
means for traversing the encoded group without use of an atomic operation.

30. The apparatus of claim 29 wherein the synchronization primitives include a compare-and-swap operation and a lock load/store-and-compare operations.

* * * * *